Aug. 2, 1927.
A. N. ZAVAGNO
1,637,507
COMPASS
Original Filed May 24, 1924
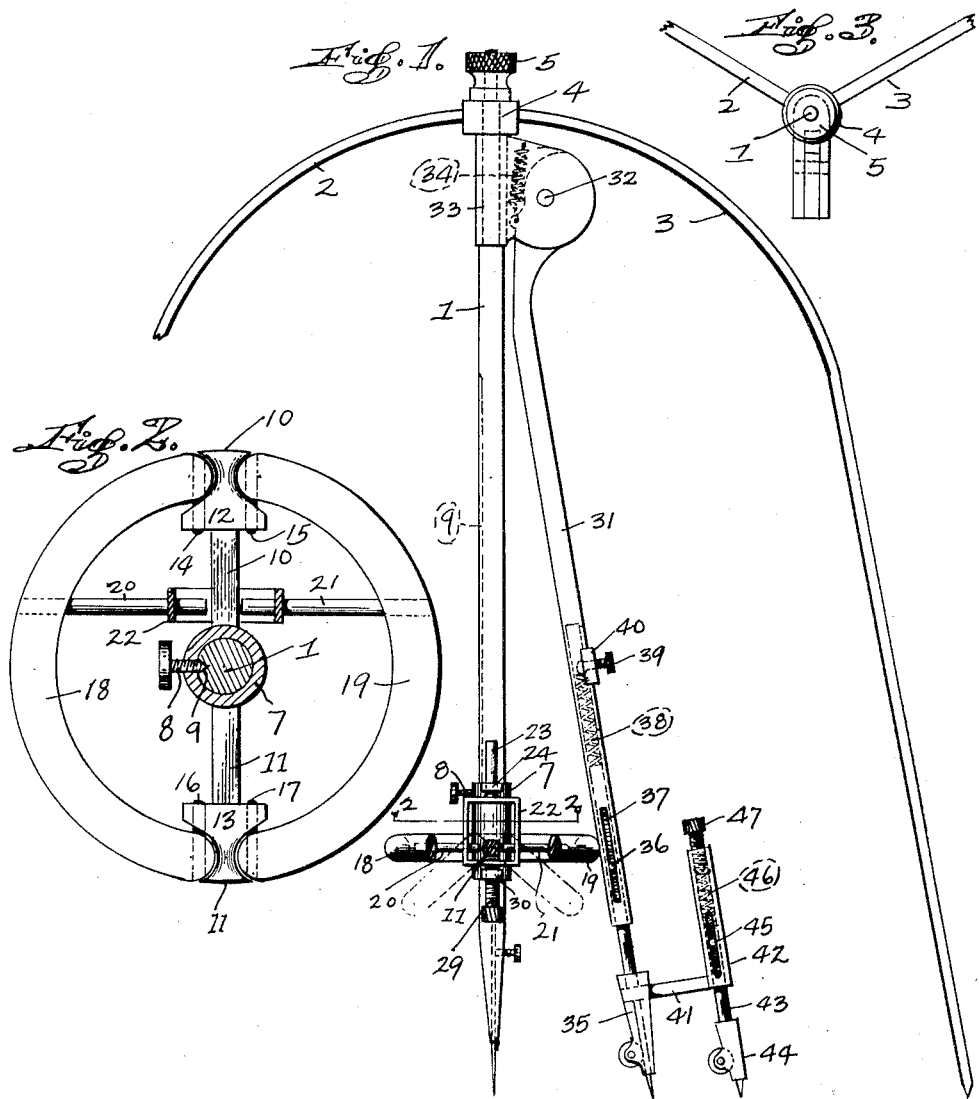
INVENTOR
ALFRED N. ZAVAGNO
BY ATTY.
Lincoln Johnson Patented Aug. 2, 1927.

1,637,507

UNITED STATES PATENT OFFICE.

ALFRED N. ZAVAGNO, OF SAN FRANCISCO, CALIFORNIA.

COMPASS.

Application filed May 24, 1924, Serial No. 715,565. Renewed May 11, 1927.

This invention relates particularly to a drawing instrument to be used in prescribing ellipses and circles.

An object of the invention is to provide a compass by which ellipses or circles of varying diameters and shapes may be perfectly formed with precision, in the same manner that an ordinary compass prescribes a circle.

A further object of the invention relates to a compass having a contour member thereon, which may be regulated and controlled to determine the size and character of any ellipses or circles desired to be prescribed, said compass being superior in point of simplicity, inexpensiveness of construction, positiveness of operation, and facility and convenience in use and general efficiency, as comparable with devices of a similar character.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings,

Fig. 1 represents a side elevation of a drawing instrument, constructed in accordance with my invention.

Fig. 2 is a plan section taken through Fig. 1, on the line 2—2.

Fig. 3 is a plan view of the upper end of Fig. 1.

In the present invention I have devised a mechanical instrument, somewhat similar to a compass, which may be used to circumscribe circles or ovals of varying lengths and widths with a minimum of time and effort, in the same manner that an ordinary compass will prescribe circles of different diameters.

In detail, the construction illustrated in the drawings comprises a shaft 1, normally adapted to stand in a vertical position by means of the support legs 2 and 3, engaging the shaft 1 at its upper end. The upper end of the shaft is threaded to be received in a bearing 4, in which the upper ends of the legs 2 and 3 are held, and a nut 5 is used to engage the threaded end of the shaft to hold said shaft in a revoluble position in the bearing 4. The lower end of the shaft 1 is provided with a sharpened point 6 thereon.

A collar 7 is slidably arranged on the shaft 1, being limited to sliding movement in a vertical direction thereon, and a set screw 8 is adjustably mounted in said collar to engage a groove 9 in the outer face of the shaft 1 to lock the said collar in any selective position, between the ends of the shaft, and to prevent said collar from turning, or rotating, about the shaft 1. On opposite sides of the collar 7 a pair of diametrically opposed shafts 10 and 11 are arranged which extend a predetermined distance out from the face of the collar. A horizontal flange 12 is provided on the projection 10, and a horizontal flange 13 is provided on the projection 11. A pair of pins 14 and 15 are mounted in the flange 12 on opposite sides of the projection 10, and in parallel relationship thereto, and a similar pair of pins 16 and 17 are mounted on the flange 13 on opposite sides of the projections 11 in parallel relationship therewith. A semi-circular segment 18 has its opposite ends rotatably mounted on the respective pins 14 and 16, and a complementary semi-circular segment 19 is arranged on the opposite side of the collar 7 with the opposite ends of said segment rotatably mounted on the respective pins 15 and 17. The opposite ends of each of the complementary, semi-circular segments 18 and 19 meet on opposite sides of the projections 10 and 11, and the outer ends of said projections 10 and 11 merge into the peripheries of the segments 18 and 19 to form a continuous and unbroken perimeter.

In order to regulate the angular position which the segments 18 and 19 may assume with respect to the shaft 1, it is necessary to provide some form of a controlling means by which the said segments may be manipulated and placed into any desired and selected position. To accomplish this result I provide a pair of pins 20 and 21 extending inwardly from the inner face of the segments 18 and 19. The free ends of the pins 20 and 21 are slidably confined in a frame 22. The upper end of the frame 22 is guided by a pin 23 on a bearing 24 fixed on the collar 7. The lower end of the frame 22 is rotatably connected to an end of an adjusting screw 29 arranged in threaded engagement with a projection 30 fixed on the collar 7. Thus by turning the screw 29 a raising or lowering movement is imparted to the frame 22 which causes a corresponding movement of the segment control arms 20 and 21 to place the complementary segments in any desired position.

A scribing arm 31 has one end thereof pivoted at 32 to a collar 33 rotatably mounted on the upper end of the shaft 1. A tension spring 34 is arranged within the collar 33 and connected at one end to said collar and at the opposite end connected to the arm 31, to create a tension thereon and to maintain the free end of said arm in proximate contact with the exterior of the shaft 1. A pen or pencil holder 35 is slidably confined in the free end of the arm 31. The holder 35 has a pin 36 thereon projecting outwardly through a slot 37 formed in the face of the arm 31. An expansion spring 38 is confined within the free end of the arm 31, to work against the inner end of the holder 35 to constantly force the same outwardly, within the limits of movement permitted by the pin 36 and slot 37. In order to adjust the tension of the spring 38, I have interposed a slide screw 39 adjacent one end of the spring 38, said slide screw 39 being threaded to engage with a collar 40 slidably mounted on the exterior of the arm 31 to permit the locating of the slide screw 39 in any desired position to regulate the tension of the spring 38.

In order to permit the scribing arm 31 to scribe parallel lines in one operation I have drilled the holder 35 to receive the arm 41, of a supplementary pen or pencil support 42. The support 42 has a central hole therethrough in which the shaft end 43 of a pen or pencil carrier 44 is mounted. A pin 45 is fixed in the shaft 43 and said pin projects outwardly through a slot formed in the holder 42. An expansion spring 46 is adapted to abut against the end of the carrier shaft 43 and a threaded adjustment screw 47 is arranged in the holder 42 to engage the spring 46 to regulate the tension thereon. The action of the auxiliary pen and pencil member is somewhat equivalent to the action which takes place on the scribing member provided on the lower end of the arm 31.

To operate the instrument, the shaft 1 would be placed in a substantially vertical position, and be there so held by the legs 2 and 3. The scribing arm 31 would be revolved around the shaft 1 whereby the reproducing end of said arm would follow the periphery of the segments 18 and 19, to prescribe ellipses or circles, according to the angularity of said segments relative to the shaft 1. The size of the figure prescribed by the arm 31 may be varied by adjusting the location of the contour member on the shaft 1 and by varying the angular position of the segments 18 and 19, between the horizontal and vertical positions, to cause the scribing arm to move in or out from the contour member to form either large or small sized ellipses or circles.

Having thus described this invention what I claim and desire to secure by Letters Patent is:—

1. A compass, comprised of a shaft; a frame slidably mounted on said shaft and extending out on opposite sides thereof; a pair of complementary semi-circular segments having the opposite ends thereof pivotally joined to the opposite ends of said frame; means on the frame to adjust the angular position of the segments; and a scribing arm having an end thereof rotatably mounted on said shaft and the opposite end adapted to contact with the periphery of the segments.

2. A compass, comprised of a shaft; a frame slidably mounted on said shaft and extending out on opposite sides thereof; a pair of complementary semi-circular segments having the opposite ends thereof pivotally joined to the opposite ends of said frame, means on the frame to adjust the angular position of the segments; a scribing arm having an end thereof rotatably mounted on said shaft; and means to maintain the opposite end of said scribing arm in contact with the periphery of the segmets.

In testmony whereof, I have hereunto set my hand at San Francisco, California, this 14th day of May 1924.

ALFRED N. ZAVAGNO.